UNITED STATES PATENT OFFICE.

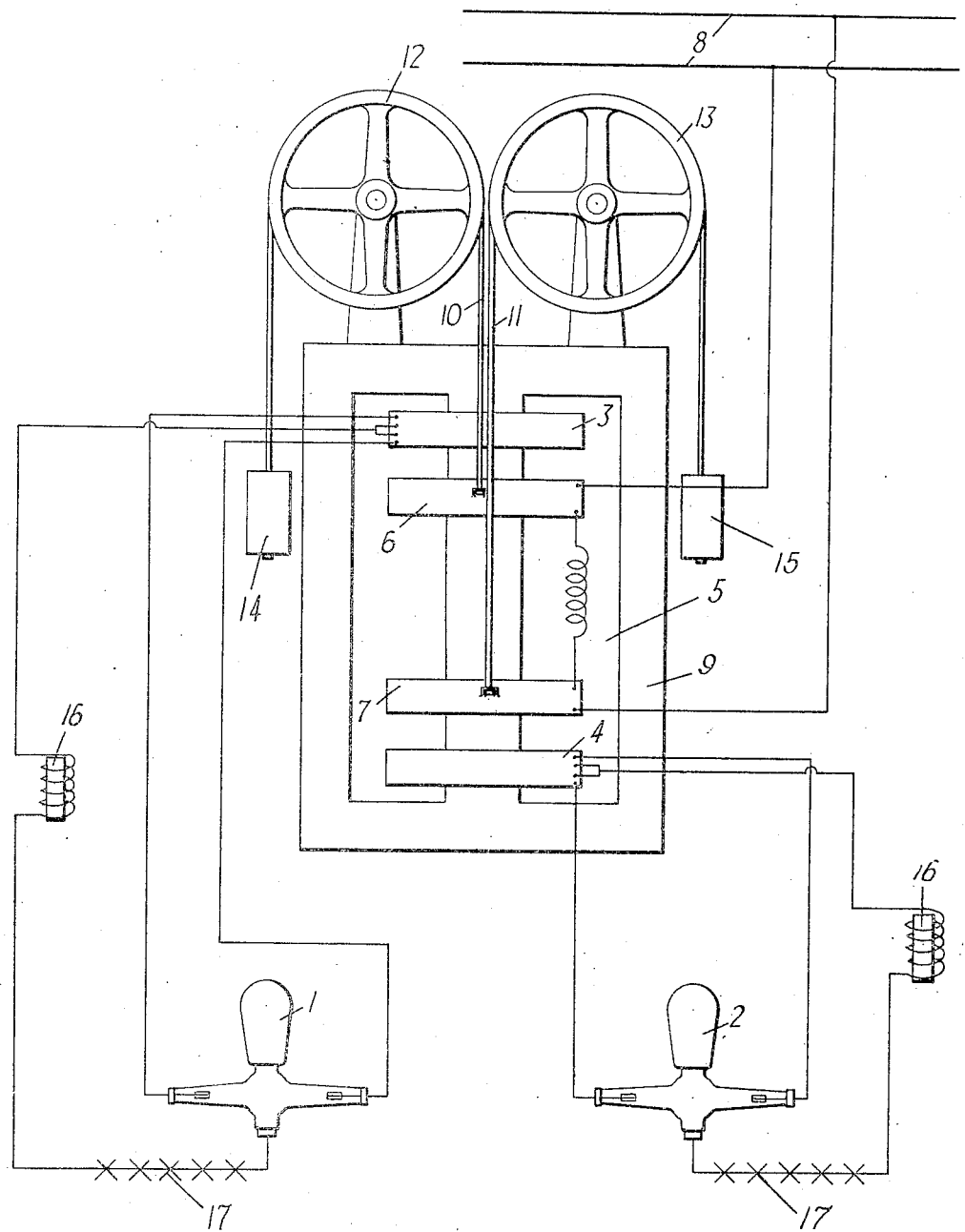

CHARLES LE G. FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CURRENT DISTRIBUTION.

1,154,852.  Specification of Letters Patent.  Patented Sept. 28, 1915.

Application filed June 21, 1912. Serial No. 705,014.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Systems of Current Distribution, of which the following is a specification.

My invention relates to systems of distributions in which alternating current is rectified by means of mercury vapor and similar devices, and particularly to such systems as embody transformer regulators for maintaining the rectified current substantially uniform in value.

In the single figure of the accompanying drawing, which diagrammatically illustrates a system embodying my invention, two mercury vapor or other suitable rectifying devices 1 and 2 are supplied with current from the secondary windings 3 and 4, respectively, of a regulating transformer 5, the primary coils 6 and 7 of which are connected in series relation to a suitable supply circuit 8. The regulating transformer comprises further a magnetizable core 9 having three legs, the central one of which is surrounded by the primary coils 6 and 7 and the secondary coils 3 and 4, the latter being located at opposite ends thereof, and the former being disposed and movable between the secondary coils. The primary coils are independently movable and are counterbalanced by being supported by cables or chains 10 and 11 that pass over pulleys 12 and 13 and are connected to weights 14 and 15, the relations of the weights of the several parts being such that the coils 6 and 7 will normally be closely adjacent to the coils 3 and 4 respectively.

The anodes of the rectifier 1 are connected to the terminals of the secondary winding 3, and the cathode is connected to an intermediate point of the said winding, an impedance device 16 and suitable translating devices 17, constituting loads, being included in the said connection. The rectifier 2 is connected in a similar manner to the secondary winding 4. The impedance devices 16 are provided for the purpose of sustaining the rectified current.

In the operation of the system, the primary coils 6 and 7 of the regulator are caused, by the magnetic forces acting between them and the secondary windings, to occupy positions depending upon the load upon the secondary circuit and such that the rectified current will have a substantially uniform value. As the rectifiers are connected independently to the respective secondary windings, and the corresponding primary and secondary windings are at opposite ends of the core leg, the two sets of coils and the two secondary circuits are not in close inductive relation. If a short circuit occurs in one of the current rectifiers, both halves of the secondary member of one of the sets of transformer windings will be traversed simultaneously by the short circuit current. The said current will induce currents in the primary winding and, by reason of the poor inductive relation between the primary coils 6 and 7, the coil 7 will oppose a high reactance to the flow of the current induced in the primary circuit by the short circuit current in the secondary circuit. Such being the case, the short circuit current will be limited to a comparatively small and harmless value. Furthermore, by reason of the high impedance to the flow of short circuit current, the short circuits themselves are rendered of infrequent occurrence.

I claim as my invention:—

1. The combination with a transformer comprising two secondary coils and two primary coils that are disposed and movably mounted between the secondary coils, of two current rectifiers that are independently connected to the secondary coils, one of them being connected to one of said coils and the other to the other coil.

2. The combination with a transformer comprising a core, and primary and secondary coils surrounding a part of said core, the primary coils being disposed and movably mounted between the secondary coils, of two current rectifiers that are independently connected to the secondary coils, one of them being connected to one of said coils and the other to the other coil.

In testimony whereof, I have hereunto subscribed my name this 18th day of June, 1912.

CHARLES LE G. FORTESCUE.

Witnesses:
OTTO S. SCHAIRER,
B. B. HINES.